T. SMITH.
SEWER TRAP.
APPLICATION FILED MAR. 7, 1910.

1,101,043.

Patented June 23, 1914.

Witnesses

Thomas Smith
Inventor.

by C. A. Snow & Co.
Attorneys

UNITED STATES PATENT OFFICE.

THOMAS SMITH, OF CUMBERLAND, MARYLAND.

SEWER-TRAP.

1,101,043.  Specification of Letters Patent.  Patented June 23, 1914.

Application filed March 7, 1910. Serial No. 547,763.

*To all whom it may concern:*

Be it known that I, THOMAS SMITH, a citizen of the United States, residing at Cumberland, in the county of Allegany and State of Maryland, have invented a new and useful Sewer-Trap, of which the following is a specification.

This invention has for its object to provide a sewer trap which can be cleaned out, if obstructed, without digging up the ground, and to this end it consists in a novel construction and arrangement of clean out pipes as will be hereinafter described and claimed, said pipes being connected to the trap, and extending therefrom to the surface of the ground, through which pipes access to the trap for the purpose stated is had.

Figure 1:
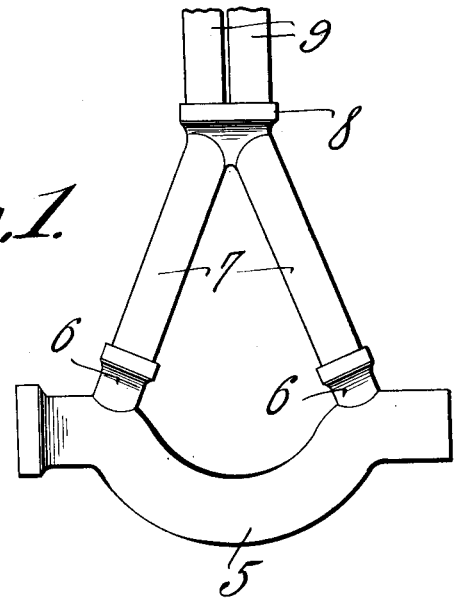
Figure 2:
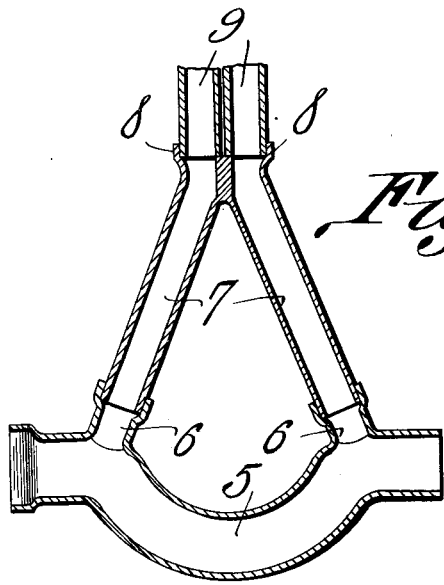

In the accompanying drawing, Figure 1 is an elevation of the trap, and Fig. 2 is a longitudinal section thereof.

In the drawing, 5 denotes a trap of ordinary form, herein shown as a single pipe having a U-shaped bend and adapted to be connected at one of its ends to a drain pipe, and at its other end to a pipe leading to the sewer. The connections may be made in the ordinary way. From the top of the pipe 5, at opposite ends of the bend, rise tubular extensions 6 communicating with the trap. To these extensions are connected pipes 7, which converge upward and come together some distance above the trap. Each of the pipes 7 is formed at its upper end with a bell mouth 8 for the reception of pipes 9 of such a length as to extend to the surface of the ground, and as these pipes 9 lie side by side they can be led up a single hole and closed by a single cover at the surface, though the cover should fit tightly in order to prevent the escape of gases. I consider it of advantage to have the inclined pipes 7 lead from similar points at opposite sides of the bend in the trap, and thus to have the whole device so formed that either end of the trap may be the sewer end so that the plumber need use no particular care in the manner of its insertion. Attention is called to the fact that if all joints are made tight and the closure at the upper ends of the pipes 9 is tight, no air can be admitted to the trap to break the liquid seal therein. Said trap is here illustrated as strictly horizontal, but in use it is intended to be inclined downward toward the sewer a little and the line of the water level standing therein would probably open one extension 6 and close the other, perhaps about as indicated by the line A on the drawings, above which there would be an air cushion in each arm of the device so as to save the joints from bursting in case sudden strain were thrown onto this trap from either direction. That is to say, if a larger volume of sewerage was admitted from the inlet end suddenly than the size of the trap could carry off, the air cushion at that side of the trap would yield a little; and conversely if the liquid in the sewer should set back up to the outlet end, the air cushion at that side of the trap would yield a little.

By providing the herein described pipes 7 and 9, the trap is accessible from the surface of the ground, and it is not necessary to do any digging if the trap requires cleaning out. A clean out device of any suitable character may be run down either one of the pipes 9 and 7 into the trap, and the obstruction removed therefrom. If the obstruction is stuck tightly in the trap, a clean out device may be run down into the trap from both ends thereof, and in this manner work this obstruction loose. The insertion of the clean-out device into the trap is facilitated in view of the fact that the bent pipe 5 has its tubular extensions 6 located above the end portions of the bent pipe so that a clean-out device, when inserted through either pipe 7, will strike the curved bottom portion of the bent pipe 5 and thus be deflected inwardly toward the center of the bent pipe.

What is claimed is:

A device of the class described formed in two pieces, one of said pieces consisting of a pipe bent downwardly between its inlet and outlet ends along a curved line to form a trap and having tubular integral extensions converging upwardly from points directly over the ends of the bend, the outermost ends of the bottom of the bend being in substantially vertical alinement with the outermost portions of the openings from which the extensions project, and the second piece of the pipe consisting of a bell mouth, a partition dividing the mouth into separate openings, and pipes diverging downwardly from the respective openings and seated at their lower ends in the extensions on the other piece, said downwardly diverging members forming an inverted V, the bell mouth, downwardly diverging members, the trap, and the extensions at the ends of the trap being all disposed in substantially the same plane, said downwardly diverging members constituting means for directing a clean-out device into the end portions of the trap.

In testimony that I claim the foregoing as my own, I have hereto affixed my signature in the presence of two witnesses.

THOMAS SMITH.

Witnesses:
F. BROOKE WHITING,
GEO. LOUIS EPPLER.

Copies of this patent may be obtained for five cents each, by addressing the "Commissioner of Patents, Washington, D. C."